(12) United States Patent
Wood

(10) Patent No.: X4022
(45) Date of Patent: Feb. 10, 1825

(54) SHOVELS & SPADES

(76) Inventor: James Wood

James Wood
Letters Patent

The Schedule referred to in these Letters Patent
and making part of the same containing a description
in the words of the said James Wood himself of
his improvement in Making Shovels and Spades This improvement in the making or manufactur-
ing of shovels and Spades consists in making the
blades entirely of steel and attaching the blade
to the handle by means of steel or iron straps fas-
tened to the blade, and also to the handle by rivets
on the front and back side of the blade and handle.
or by a strap on the back side only. the support of
the front side formed from the plate of which the
said plate is made. and in making the said
blades each from a single piece of steel rolled
to the proper dimensions and not hammered.
The difference between this improved mode of
making or manufacturing shovels and Spades and
the modes heretofore in use is that heretofore they have
been made of iron and none have been made of
steel: the supports by which the blade is fastened
to the handle by the old method are formed from
and are part of the blades themselves instead of being
fastened to the blades by rivets and the whole
formed from a sheet of iron doubled and welded
together by hammering instead of being rolled from
a piece of steel as by this method. In testimony
that the above is a true specification of my said
improvement I have hereunto set my hand and
seal this 22d day of January AD. eighteen hundred and
twenty.

United States Patent

Patent No.: X4022

Twenty five
Witnesses
William J. Smith
Geo. C. Goddard

James Wood (Granted by Congress)

Exd.
MGL 278 words

UNITED STATES PATENT OFFICE.

JAMES WOOD, OF PHILADELPHIA, PENNSYLVANIA.

IMPROVEMENT IN THE MANUFACTURE OF SHOVELS AND SPADES.

Specification forming part of Letters Patent dated February 10, 1825.

*To all whom it may concern:*

Be it known that I, JAMES WOOD, of Philadelphia, Pennsylvania, have invented an Improvement in Making Shovels and Spades, of which the following is a specification.

This improvement in the making or manufacturing of shovels and spades consists in making the blades entirely of steel and attaching the blade to the handle by means of the steel or iron straps fastened to the blade, and also to the handle by rivets on the front and back side of the blade and handle, or by a strap on the back side only, the support of the front side formed from the plate of which the said plate is made, and in making the said blades each from a single piece of steel rolled to the proper dimensions and not hammered.

The difference between this improved mode of making or manufacturing shovels and spades and the modes heretofore in use is that heretofore they have been made of iron, and none have been made of steel. The supports by which the blade is fastened to the handle by the old method are formed from and are part of the blades themselves, instead of being fastened to the blades by rivets, and the whole formed from a sheet of iron doubled and welded together by hammering, instead of being rolled from a piece of steel, as by this method.

In testimony that the above is a true specification of my said improvement I have hereunto set my hand this 22d day of January, A. D. 1825.

JAMES WOOD.

Witnesses:
WILLIAM T. SMITH,
GEO. C. GODDARD.

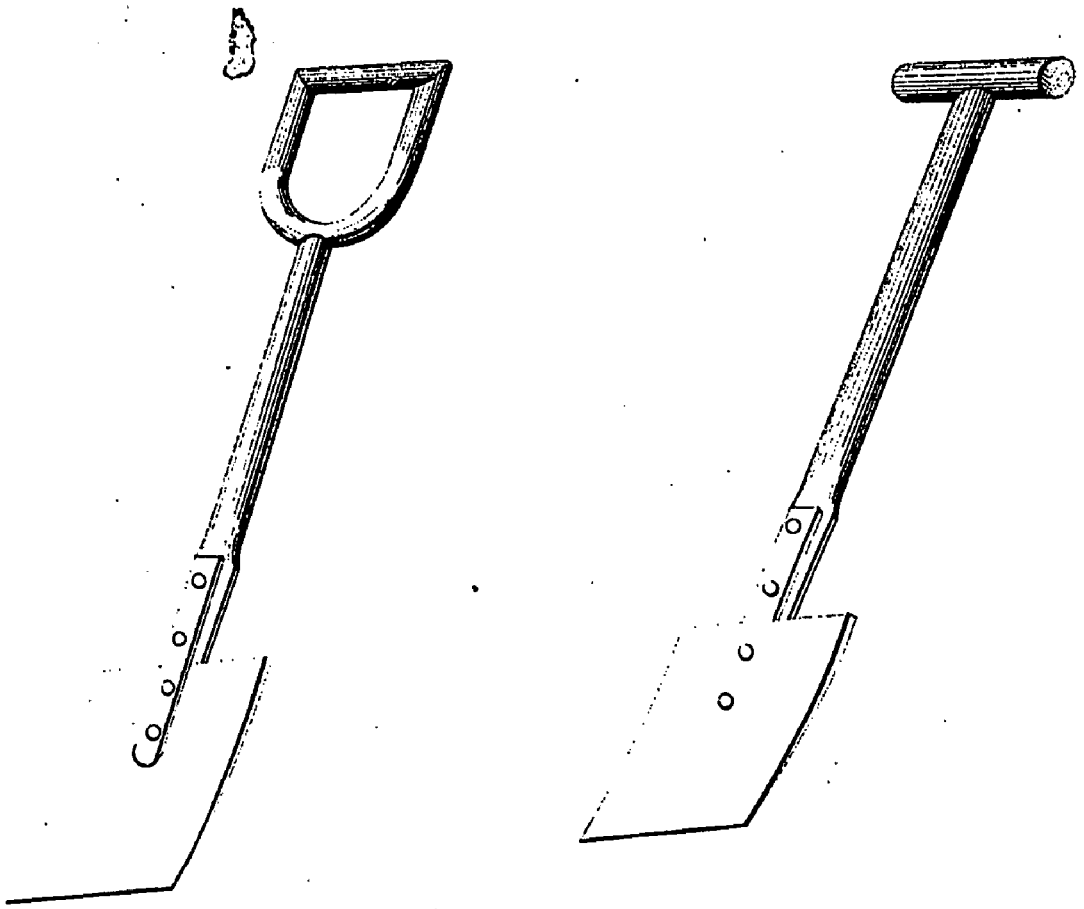

United States Patent
Patent No.: X4022
J. WOOD.
Shovel.
Patented Feb. 10, 1825.